United States Patent
Sung et al.

(10) Patent No.: US 10,560,002 B2
(45) Date of Patent: Feb. 11, 2020

(54) COOLANT FLOW DISTRIBUTION USING COATING MATERIALS

(71) Applicant: FORD GLOBAL TECHNOLOGIES, LLC, Dearborn, MI (US)

(72) Inventors: Myung Ki Sung, Ypsilanti, MI (US); Edward Chan-Jiun Jih, Troy, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 295 days.

(21) Appl. No.: 15/473,054

(22) Filed: Mar. 29, 2017

(65) Prior Publication Data

US 2018/0287469 A1  Oct. 4, 2018

(51) Int. Cl.
*H02K 5/20* (2006.01)
*H02K 9/19* (2006.01)

(52) U.S. Cl.
CPC ............ *H02K 9/19* (2013.01); *H02K 5/20* (2013.01); *Y02T 10/641* (2013.01)

(58) Field of Classification Search
CPC ........... Y02T 10/641; H02K 5/20; H02K 9/19
USPC ......................................... 310/52, 54, 58, 64
See application file for complete search history.

(56) References Cited

U.S. PATENT DOCUMENTS

| | | |
|---|---|---|
| 5,042,991 A | 8/1991 | Kunz et al. |
| 6,103,379 A | 8/2000 | Margel et al. |
| 6,458,867 B1 | 10/2002 | Wang et al. |
| 6,503,958 B2 | 1/2003 | Hughes et al. |
| 6,645,569 B2 | 11/2003 | Cramer et al. |
| 6,723,378 B2 | 4/2004 | Hrubesh et al. |
| 6,743,467 B1 | 6/2004 | Jones et al. |
| 7,985,451 B2 | 7/2011 | Luzinov et al. |
| 7,989,619 B2 | 8/2011 | Guire et al. |
| 7,998,554 B2 | 8/2011 | Wang et al. |
| 8,007,638 B2 | 8/2011 | Baker et al. |
| 8,187,707 B2 | 5/2012 | Van Benthem et al. |
| 8,202,614 B2 | 6/2012 | Koene et al. |
| 8,258,206 B2 | 9/2012 | Kanagasabapathy et al. |
| 8,361,176 B2 | 1/2013 | Seth et al. |
| 9,203,273 B2 | 12/2015 | Sawada et al. |
| 2002/0074868 A1* | 6/2002 | Ishida ................ H02K 1/185 310/54 |
| 2006/0029808 A1 | 2/2006 | Zhai et al. |
| 2007/0194639 A1* | 8/2007 | Birdi ................ H02K 1/20 310/54 |

(Continued)

FOREIGN PATENT DOCUMENTS

WO  2013/058843 A2  4/2013
WO  2014/198451 A1  12/2014

*Primary Examiner* — Hanh N Nguyen
(74) *Attorney, Agent, or Firm* — David Kelley; Brooks Kushman P.C.

(57) ABSTRACT

An electric machine is disclosed. The electric machine includes a stator core within a transaxle housing and having a channel-less outer surface portion. The electric machine also includes one or more layers of an oleophobic or hydrophobic patterned coating defining boundaries wrapping around a perimeter of the stator core, and one or more layers of an oleophilic or hydrophilic coating on the portion within the boundaries configured to direct coolant flow over the oleophilic or hydrophilic coating within the boundaries.

18 Claims, 6 Drawing Sheets

(56) References Cited

U.S. PATENT DOCUMENTS

| | | | |
|---|---|---|---|
| 2008/0299359 A1* | 12/2008 | Klaussner | H02K 3/38 |
| | | | 428/206 |
| 2009/0127946 A1* | 5/2009 | Fee | H02K 5/20 |
| | | | 310/64 |
| 2010/0314575 A1 | 12/2010 | Gao et al. | |
| 2012/0009396 A1 | 1/2012 | Sikka et al. | |
| 2012/0045954 A1 | 2/2012 | Bleecher et al. | |
| 2012/0153718 A1* | 6/2012 | Rawlinson | H02K 5/20 |
| | | | 307/10.1 |
| 2013/0109261 A1 | 5/2013 | Koene | |
| 2014/0321976 A1* | 10/2014 | Kerns | F01D 1/36 |
| | | | 415/90 |

* cited by examiner

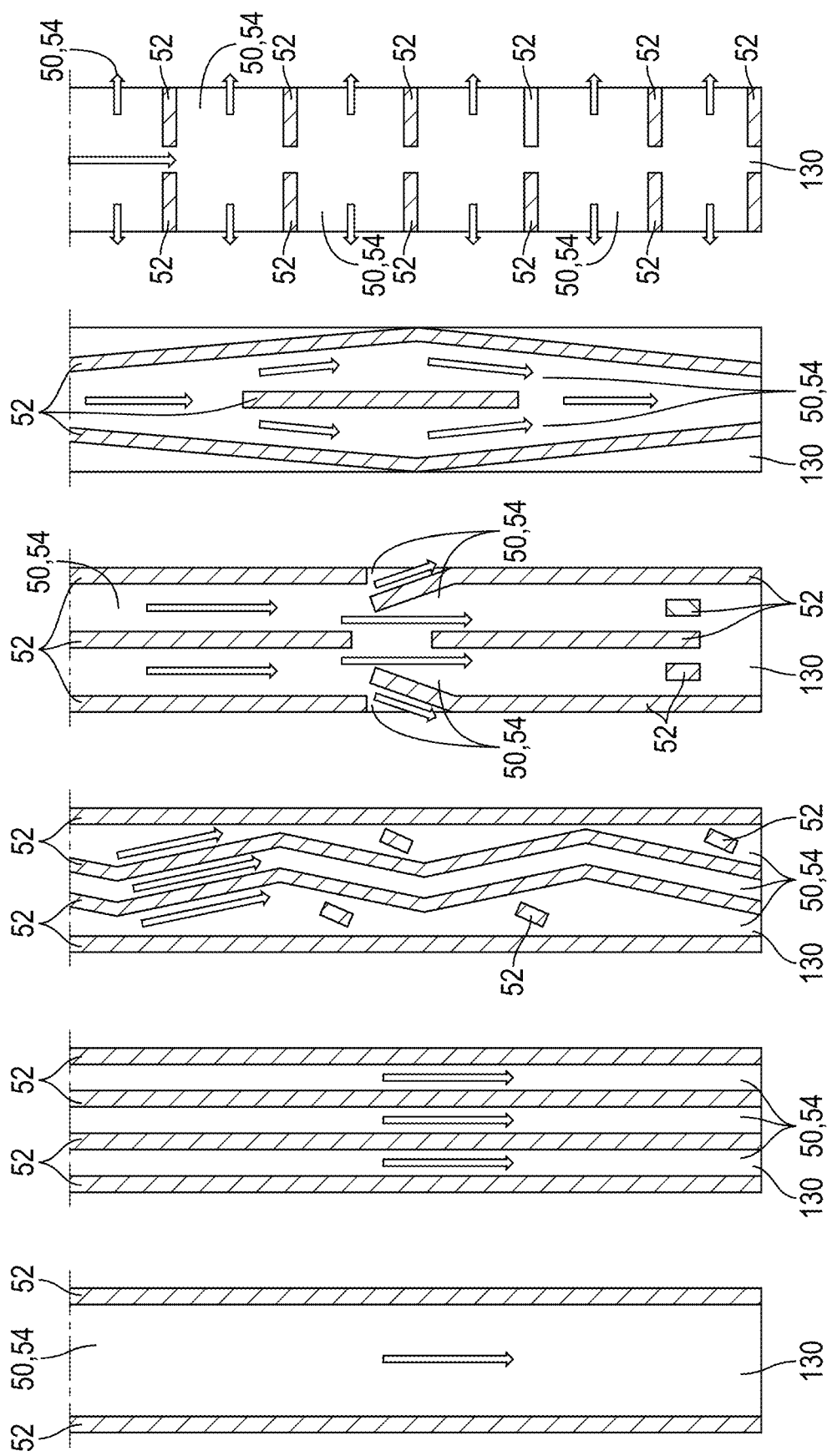

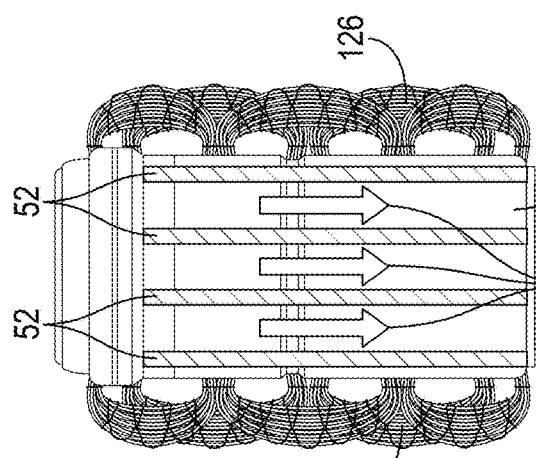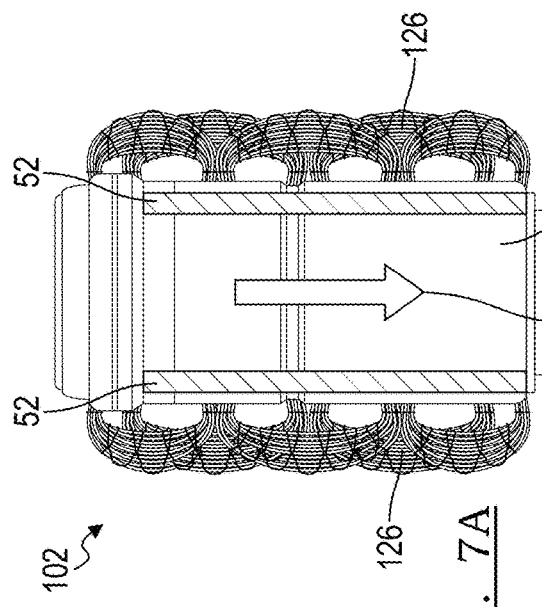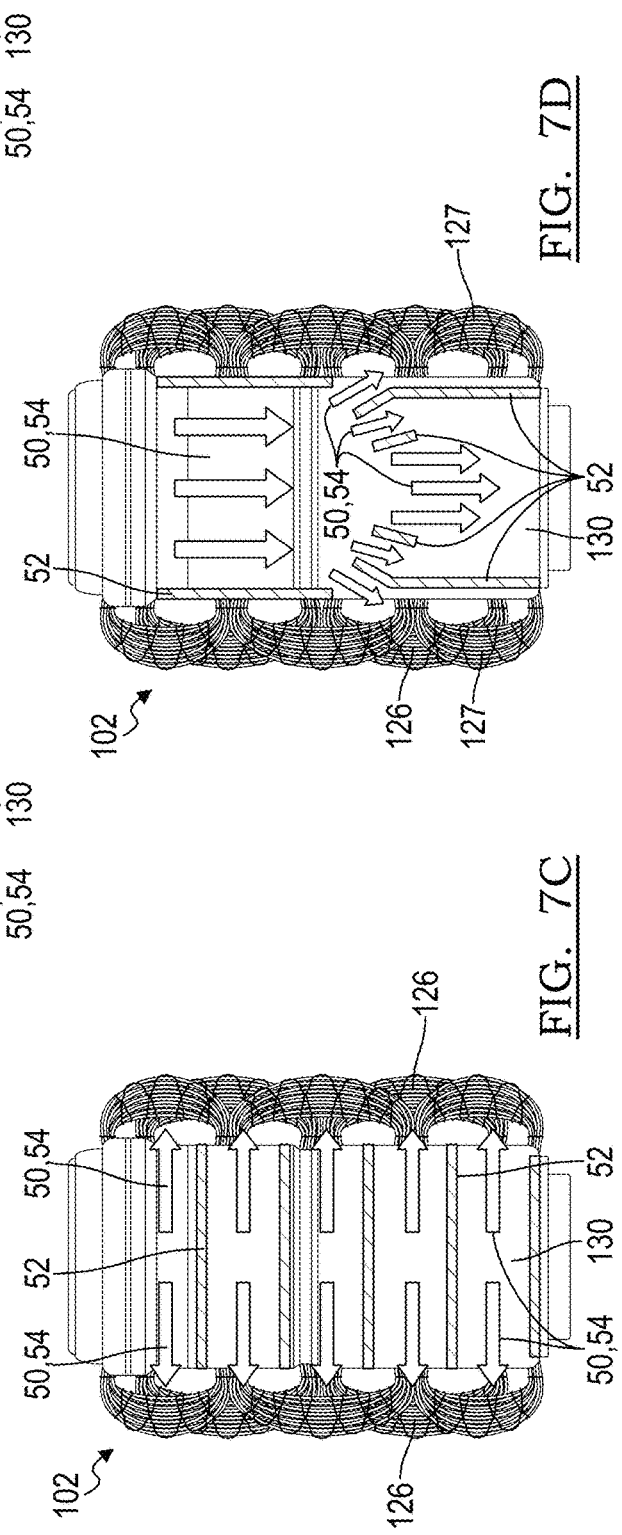

COOLANT FLOW DISTRIBUTION USING COATING MATERIALS

TECHNICAL FIELD

The present disclosure relates to the use of coating materials for coolant flow distribution, for example, in electric machines and/or inverters.

BACKGROUND

The power density of electronic devices, such as electric machines and power inverters, is continuously increasing to meet weight and cost reduction targets. To meet these targets, it is generally important to increase the efficiency and performance of the electronic device. The performance and efficiency of electric machines are generally limited by the temperature constraint on the copper windings and/or the maximum current which should overcome the friction losses in the air gap. For electric machine thermal management, it may be important to maintain uniform coolant flow (e.g., water/glycol, oil, or Automatic Transmission Fluid) on the end windings of the electric machine to remove the localized hot spots. The performance and efficiency of power inverters are generally limited by the thermal constraints in insulated-gate bipolar transistors (IGBTs) and/or diodes. For inverter thermal management, a liquid cold plate may be used to cool components, such as IGBTs, diodes, solder layers, etc., inside the inverter.

SUMMARY

According to an embodiment, an electric machine is disclosed. The electric machine includes a stator core within a transaxle housing and having a channel-less outer surface portion. The electric machine also includes one or more layers of an oleophobic or hydrophobic patterned coating defining boundaries wrapping around a perimeter of the stator core, and one or more layers of an oleophilic or hydrophilic coating on the portion within the boundaries configured to direct coolant flow over the oleophilic or hydrophilic coating within the boundaries.

In one or more embodiments, the one or more layers of the oleophobic or hydrophobic patterned coating may define at least two spaced apart boundary lines to direct coolant flow on at least one straight coolant flow path. The one or more layers of the oleophobic or hydrophobic patterned coating may define intermittent boundaries to direct coolant flow on a plurality of coolant flow paths. Further, the intermittent boundaries may include at least two spaced apart boundary lines forming a primary coolant flow path and at least one boundary in a portion of the primary coolant flow path forming one or more secondary coolant flow paths to direct coolant to target areas of the stator core. The one or more layers of the oleophobic or hydrophobic patterned coating may define a zig-zag boundary to direct coolant flow on a zig-zag coolant flow path. In one or more embodiments, the one or more layers of the oleophobic or hydrophobic patterned coating may be a super oleophobic or hydrophobic coating having a contact angle with an oil-based or water-based coolant of at least 130 degrees, respectively. The coolant may be an automatic transmission fluid.

According to an embodiment, an electric machine is disclosed. The electric machine includes a stator core, within a transaxle housing, having a channel-less outer surface portion, and one or more layers of an oleophobic or hydrophobic patterned coating. The one or more layers of an oleophobic or hydrophobic patterned coating define boundaries wrapping around a perimeter of the stator core and are configured to direct coolant flow over the portion within the boundaries.

In one or more embodiments, the electric machine may further include one or more layers of an oleophilic or hydrophilic coating on the portion within the boundaries configured to direct coolant within the boundaries. The one or more layers of the oleophobic or hydrophobic patterned coating may define at least two spaced apart boundary lines to direct coolant flow on at least one straight coolant flow path on the outer surface portion. The one or more layers of the oleophobic or hydrophobic patterned coating may define intermittent boundaries including at least two spaced apart boundary lines forming a primary coolant flow path and at least one boundary in a portion of the primary coolant flow path forming one or more secondary coolant flow paths on the outer surface portion. Further, the one or more secondary coolant flow paths may direct coolant to end-windings of the stator core. In one or more embodiments, the one or more layers of the oleophobic or hydrophobic patterned coating may define a zig-zag boundary to direct coolant flow on a zig-zag coolant flow path on the outer surface portion. The one or more layers of the oleophobic or hydrophobic patterned coating may be a super oleophobic or hydrophobic coating having a contact angle with an oil-based or water-based coolant of at least 130 degrees, respectively. The coolant may be an automatic transmission fluid.

According to an embodiment, a method includes applying one or more layers of an oleophobic or hydrophobic patterned coating to an outer surface portion of a stator core. The one or more layers define boundaries wrapping around a perimeter of the stator core and are configured to direct coolant flow within the boundaries.

In one or more embodiments, the method may further include applying one or more layers of an oleophilic or hydrophilic coating to the outer surface portion within the boundaries to direct coolant flow within the boundaries. The one or more layers of the oleophilic or hydrophilic coating may be applied by spraying. The one or more layers of the oleophobic or hydrophobic patterned coating may be applied by spraying. The one or more layers of the oleophobic or hydrophobic patterned coating may be a super oleophobic or hydrophobic coating having a contact angle with an oil-based or water-based coolant of at least 130 degrees, respectively.

BRIEF DESCRIPTION OF THE DRAWINGS

FIGS. 6A, 6B, 6C, 6D, 6E, and 6F are examples of coolant channel shapes or patterns that may be formed using a (super) oleophobic or hydrophobic coating, including a straight, multi-channel, zig-zag, expanding with secondary flow, expanding-to-contracting, and side-feed, respectively.

FIGS. 7A, 7B, 7C, and 7D are front views of stator core outer surfaces having a (super) oleophobic or hydrophobic coating forming coolant channel shapes or patterns including a single flow path, multiple flow paths, side-feed paths, and expanding with secondary flow, respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some electric machines, for example, an electric machine for a hybrid vehicle or an electric vehicle, operate in harsh conditions. The harsh conditions may include temperature, humidity, airflow, and debris. The harsh conditions may be attributed to environmental aspects that may be further exacerbated by requirements of the electric machine, such as constraints on size, configuration, input power, and output power. To help reduce heat generated during the operation of the electric machine, a cooling system may be used. The cooling system may include a fluid that flows around winding and components of the electric machine. In some cases, the fluid is in contact with the windings and components of the electric machine. The fluid may then be circulated, for example through a radiator, to remove some of the heat from the electric machine. For example, in some automotive systems, an electric machine is cooled with the automatic transmission fluid (ATF) that is circulated around the windings and components and then circulated to a radiator. Typically, the electric machine is configured such that a gap is formed between a stator and the transaxle housing in which the electric machine is contained. The gap increases the maximum electric machine temperature due to thermal contact resistance. As such, reduction of rotating resistance and friction in the gap is an important aspect to increase the performance of the electric machine. The rotating resistance includes the friction of air or other liquids and the surface of the rotor. The gap between the stator outer surface and the transaxle can accommodate coolant flow to increase thermal performance on the stator outer surface.

According to one or more embodiments of the present disclosure, resistance and friction is reduced by applying advanced coating materials, including a "repellant" coating and a "wetting" coating. For example, repellant coatings include oleophobic, super-oleophobic, hydrophobic, and super-hydrophobic coatings. Wetting coatings include oleophilic, super-oleophilic, hydrophilic, and super-hydrophilic coatings. Both repellant and wetting coatings may be applied to the electric machine to improve efficiency. Advanced coating components will increase or decrease the contact angle of the ATF (or other liquid) on the coated surface.

Figure 1A:
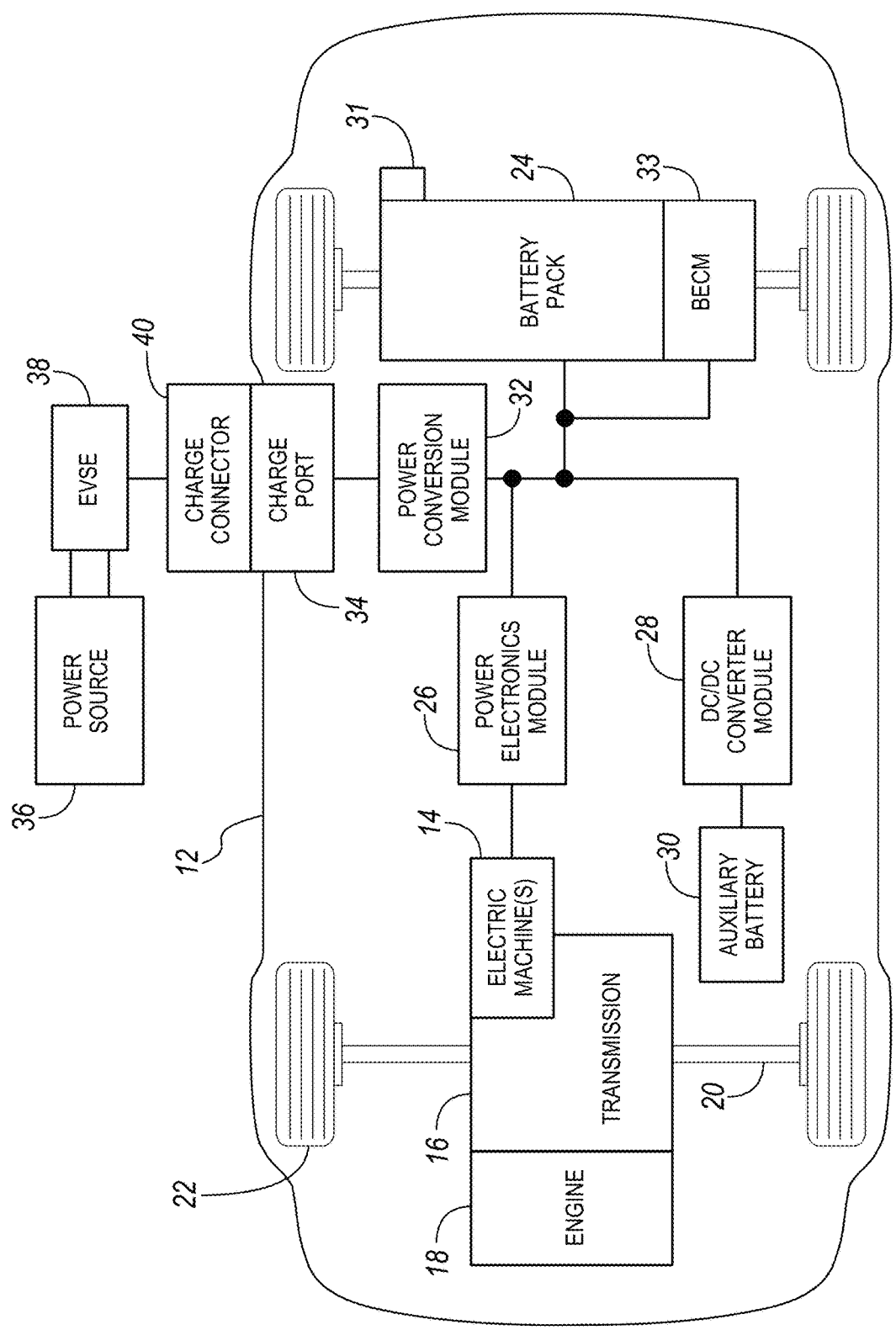
FIG. 1A is a schematic diagram illustrating an example of an electrified vehicle.

FIG. 1A depicts a schematic of an example of a PHEV, referred to as a vehicle herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to a set of wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electrified vehicle which includes components for a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. The various components discussed may have one or more associated controllers to control and monitor the operation of the components. The controllers may communicate via a serial bus (e.g., Controller Area Network (CAN)) or via discrete conductors.

Current examples of thermal management assemblies for electric machines may introduce oil to portions of the electric machine for cooling purposes. The oil may be dripped or sprayed onto wire end windings of the electric machine. However, this practice may not be very effective in cooling the end windings due to a non-uniformity of coolant flow as applied to the end windings. An air cooled thermal management assembly is another example of an assembly to assist in managing thermal conditions of an electric machine. In this example, a fan or blower may be located adjacent the end windings to push air thereto for cooling purposes.

Figure 1B:
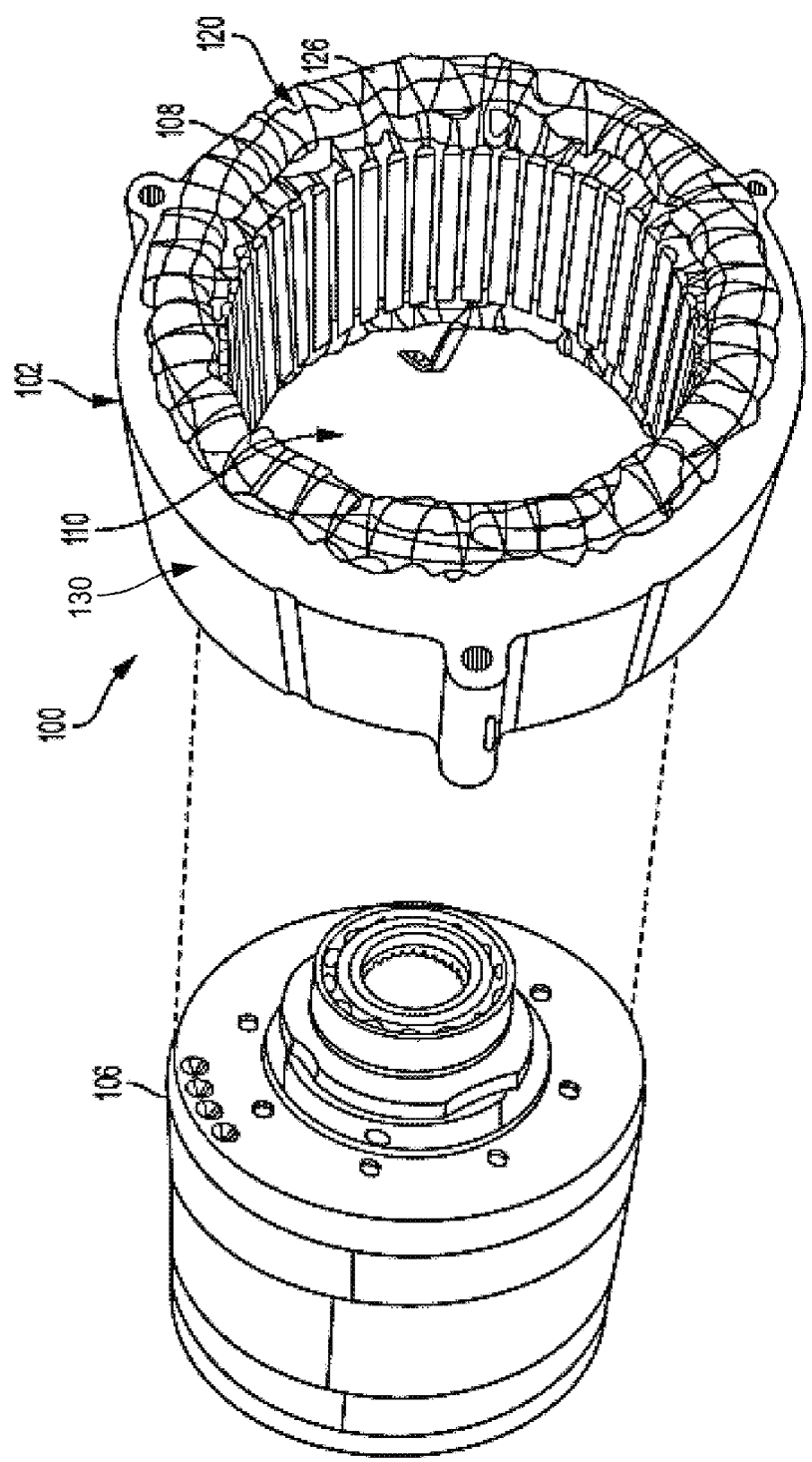
FIG. 1B is a perspective view of an exemplary electric machine.

FIG. 1B shows an example of an electric machine for an electrified vehicle, referred to generally as an electric machine 100. The electric machine 100 may include a stator core 102 and a rotor 106. Electrified vehicles may include two, or more, electric machines. For example, for an electrified vehicle with two electric machines, one of the electric machines may function primarily as a motor and the other may function primarily as a generator. The motor may operate to convert electricity to mechanical power and the generator may operate to convert mechanical power to electricity. The stator core 102 may define an inner surface 108, an outer surface 130, and a cavity 110. The rotor 106 may be sized for disposal and operation within the cavity 110. A shaft (not shown) may be operably connected to the rotor 106 to drive rotation thereof.

Windings 120 may be disposed within the cavity 110 of the stator core 102. In an electric machine motor example, current may be fed to the windings 120 to obtain a rotation force on the rotor 106. In an electric machine generator example, current generated in the windings 120 by a rotation of the rotor 106 may be removed to power vehicle components. Portions of the windings 120, referred to as end windings 126 herein, may protrude from the cavity 110. During operation of the electric machine 100, heat may be generated along the windings 120 and end windings 126.

Figure 2:
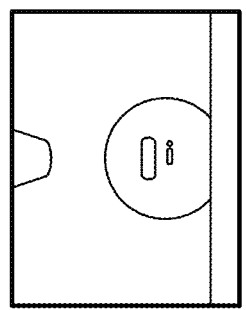
FIG. 2 is a schematic of a droplet of water (or oil) on a super hydrophobic (or super oleophobic) coating surface having a contact angle of at least 130 degrees.

In at least one embodiment, the present disclosure includes the application of a coating or coatings to affect, alter, and/or control coolant distribution on an electronic device, such as an electric machine or a power inverter. The coating(s) may be a (super) hydrophobic and/or (super) oleophobic coating or a (super) hydrophilic and/or (super) oleophilic coating. Hydrophobic and oleophobic coatings are those that repel or have a very high contact angle with water and oil, respectively. Hydrophilic and oleophilic coatings are those that attract or have a very low contact angle with water and oil, respectively. With reference to FIG. 2, a schematic of a droplet of water or oil (e.g., automatic transmission fluid, ATF) is shown on a super hydrophobic/oleophobic coating. As shown, the droplet forms almost a perfect sphere on the coating due to its repellence. Super hydrophobic/oleophobic coatings may cause droplets of water/oil to form contact angles of 130 degrees or higher with the coating. In contrast, on super hydrophilic and oleophilic coatings, droplets spread out and form an almost even layer on top of the coating. Super hydrophilic/oleophilic coatings may cause droplets of water/oil to form contact angles of 25 degrees or lower with the coating.

Any suitable hydrophobic, oleophobic, super hydrophobic, or super oleophobic coatings may be used in accordance with the present disclosure. In general, such coatings may have a high contact angle with the water or oils. Hydrophobic/oleophobic materials may generally be those forming a contact angle of at least 90 degrees, such as at least 100, 110, 120, 130, or 140 degrees, while super hydrophobic/oleophobic materials may generally be those forming a contact angle of at least 130 degrees with water/oil. The coatings may form such high contact angles as a result of a nano-scale surface structure. For example, the surface of the coating may be covered in very small projections, making the coating rough on a nano-scale. The gaps between the projections may trap air and make it energetically unfavorable for liquids to wet the surface. Similarly, any suitable hydrophilic, oleophilic, super hydrophilic, or super oleophilic coatings may be used in accordance with the present disclosure. In general, such coatings may have a low contact angle with the water or oils. Hydrophilic/oleophilic materials may generally be those forming a contact angle of at most 50 degrees, such as at most 40 or 30 degrees, while super hydrophilic/oleophilic materials may generally be those forming a contact angle of 25 degrees or less with water/oil.

Examples of various (super) hydrophobic/oleophobic and (super) hydrophilic/oleophilic compositions and treatment methodologies are provided in U.S. Patent Publication Nos. 2013/0109261, 2012/0009396, 2010/0314575, 2012/0045954, and 2006/0029808, and also in U.S. Pat. Nos. 8,007,638, 6,103,379, 6,645,569, 6,743,467, 7,985,451, 8,187,707, 8,202,614, 7,998,554, 7,989,619, 5,042,991, 8,361,176, 8,258,206, 6,458,867, 6,503,958 and 6,723,378, and also in International Publication No. WO2013/058843, the disclosures of which are incorporated herein by reference.

The (super) hydrophobic/oleophobic coating may be applied to the electronic device using any suitable method, which may depend on the composition of the coating itself. In one embodiment, the coating may be applied by spraying. In another embodiment, the coating may be applied using a form of deposition, such as physical vapor deposition (PVD) or chemical vapor deposition (CVD). In another embodiment, the coating may be physically transferred to the electronic device, such as by rolling or brushing. Regardless of the method of application, masks may be used to only coat certain desired areas or regions.

Figure 4:
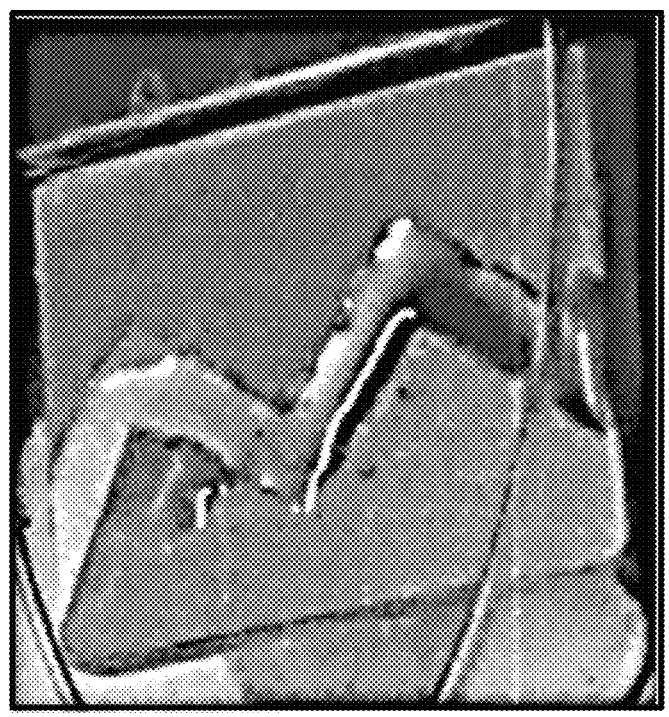
FIG. 4 is a photograph of a coolant channel formed by a (super) oleophobic or hydrophobic coating according to an embodiment.
Figure 3:
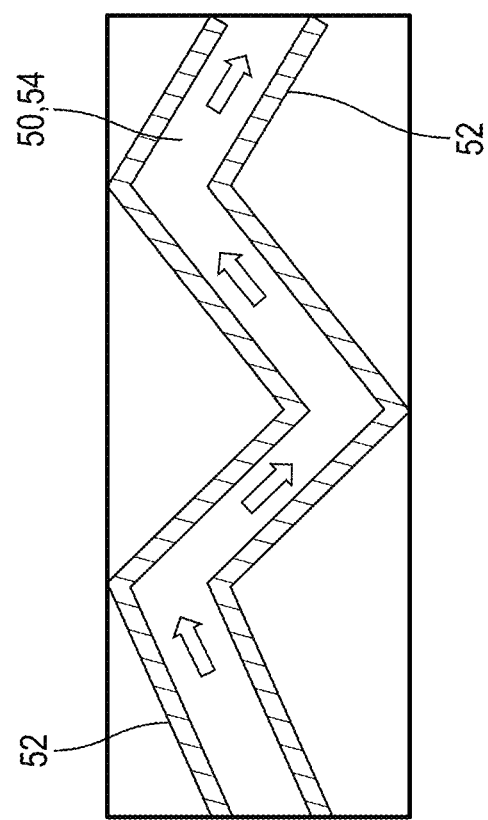
FIG. 3 is a top view of an exemplary coolant channel formed between two coating boundaries.

With reference to FIGS. 3 and 4 a schematic example and photograph of an experimental sample are shown of a hydrophobic/oleophobic (hereinafter, "repellant") coating forming a flow path 50 for a liquid, such as coolant (e.g., water or ATF). The flow path 50 may be formed by one or more lines, strips, layers, or areas 52 of the repellant coating, forming boundaries. In the example shown in FIG. 3, two spaced apart lines 52 form the boundaries for the flow path 50. The lines 52 may be evenly spaced to form the flow path 50 having a constant or substantially constant width. However, in other embodiments, the flow path 50 may have a non-constant width. The lines 52 forming the boundaries may be configured to form a flow path 50 having any shape or pattern. In the embodiment shown in FIG. 3, the lines 52 form a zig-zag flow path 50, which may also be referred to as a sinuous, serpentine, winding, or oscillating flow path 50.

In at least one embodiment, the line(s) 52 of the repellant coating may form boundaries for the flow path 50 without any raised walls or sunken/carved channels. That is, the flow path 50 may be formed due solely to the repellence of the liquid (e.g., coolant) from the coating. The use of the boundary lines, strips, areas, etc. of the repellant coating may therefore allow for control or influence of the flow of coolant without the need for relatively large physical barriers, such as channels walls, trenches, or troughs. Instead, a coating may be used to control/influence the flow of coolant. As shown in FIG. 4, the coating may be very thin so as to be essentially even or flush with the surface applied thereto relative to the height of the coolant being controlled. For example, the coating may have a thickness of less than 1 mm, such as less than 500 µm, 250 µm, 100 µm, 50 µm, 25 µm, or 15 µm.

In at least one embodiment, in addition to the boundary line(s) 52 of the repellant coating, a hydrophilic or oleophilic coating 54 may also be applied to form the flow path 50. In one embodiment, at least a portion of the area of the flow path 50 may be coated with the hydrophilic or oleophilic coating (herein after "wetting coating"). For example, the entire area of the flow path 50 may be coated with the wetting coating. In another embodiment, lines of the wetting coating may be applied within the flow path 50. For example, lines may be applied that are parallel to the lines 52 of the repellant coating. Accordingly, the wetting coating may help further control the flow of a coolant within the flow path. The lines 52 of the repellant coating may form an outer boundary of the flow path 50 while the wetting coating encourages the coolant to flow across it in the desired direction.

Figure 5:
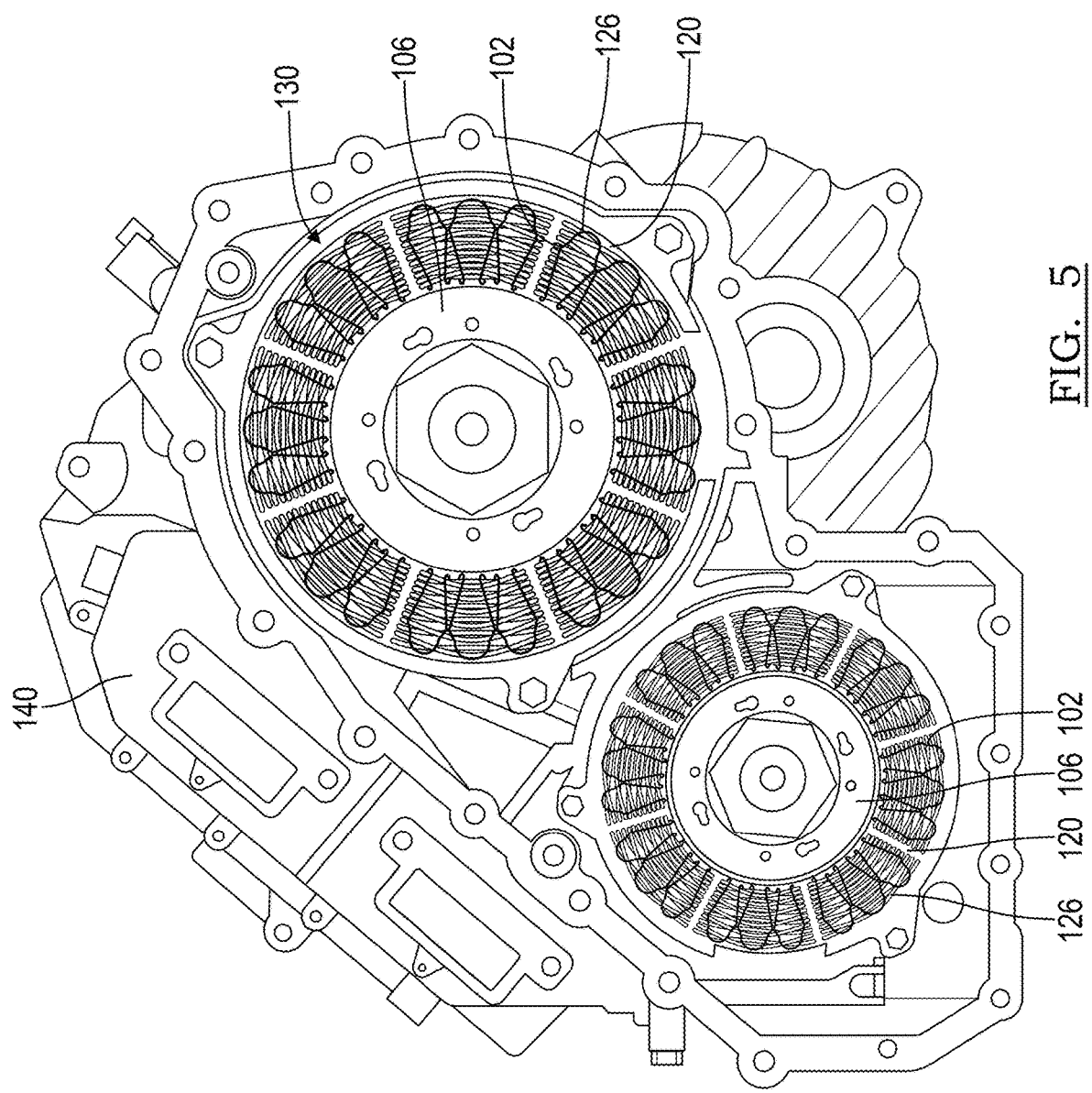
FIG. 5 is a perspective view of a transaxle housing with an electric machine.

With reference to FIG. 5, an exemplary transaxle housing 140 with an electric machine 100 is shown. In the transaxle housing 140, the electric machine includes stator(s) 102, defining a cavity, and rotor(s) 106 disposed within the cavity. Although two stators and rotors are shown for illustrative purposes, the transaxle housing may include one or more stators and rotors per vehicle requirements. Although a single rotor or stator may be described hereinafter, the present disclosure relates to any number of stators and rotors included in an electric machine. The stator includes windings 120 and end-windings 126. The stator 102 also includes an outer surface 130 which is separated from the transaxle housing 140 by an air gap. The advanced coatings materials (such as the repellant coating and wetting coating) are used on the outer surface 130 of the stator to direct coolant flow on the outer surface 130 without adding fixtures to the target area. Also, the repellant and wetting coating provide a controlled coolant flow path formed by patterned coating boundary lines. The coating patterns provide boundaries to guide coolant directly to critical areas, such as neutral points and hot spots on the end-windings 126. Utilizing the repellant and wetting coatings enable coolant flow control, thus reducing the overall stator temperatures by maximizing cooling on the stator outer surface.

With reference to FIGS. 6A-6F, examples of different shapes and patterns of flow paths 50 that may be formed using the repellant coating are shown. The patterns shown are for illustrative purposes, and other patterns not shown may be formed by the coating boundaries depending on the desired flow path for cooling. FIG. 6A shows a straight flow path 50 on outer surface 130 having a constant width, which may be formed by spaced apart parallel boundary lines 52 of repellant coating. FIG. 6B shows multiple straight flow paths 50 on outer surface 130, having constant widths, which may be formed by multiple spaced apart parallel boundary lines 52 of repellant coating. FIG. 6C shows a zig-zag flow path 50 on the outer surface 130, which may also be referred to as sinous, serpentine, winding, or oscillating flow path 50. The flow path may be formed by spaced apart boundary lines 52 of repellant coating. Segments of the boundary lines 52 may be parallel, such that the flow path 50 has a constant width. Also, additional boundaries 52 of repellant coating may be included, not forming lines, to provide flow distribution alterations in the zig-zag flow paths 50. FIG. 6D shows a split flow path 50 with boundaries 52 forming two secondary flow paths towards the end windings. A portion of the coolant on the flow path 50 is guided by boundaries 52 to the end-windings, and the rest of the coolant flows down an expanding angled path into a straight path of constant width. As shown, an additional boundary 52, not forming a line, may be included to provide fluid distribution alterations in the flow path 50. FIG. 6E shows a flow path 50 on outer surface 130 that expands over a certain distance, and then the expansion stops at an inflection point, and then contracts or narrows. This may be referred to as a bulging flow path. FIG. 6F shows a center-feed configuration where repellant coating provides stepped boundaries 52 around the periphery of the stator outer surface 130. The flow path 50 is down the center of the outer surface, and to the sides as portions of coolant flow are directed by the boundaries 52 to the end-windings. Similar to the above with respect to FIGS. 3-4, a wetting coating 54 may also be applied in the flow path 50 to further control the coolant flow, however it is not required.

The examples shown and described in FIGS. 3-6 relate to flow paths 50 in which the boundaries 52 are two or more spaced apart lines or strips of coating to form at least one flow path. There may be fewer lines (e.g., one) or more lines (e.g., three or more as shown in the examples), as well as boundaries not forming lines included to control the flow of a liquid, such as coolant. Boundaries 52 may be applied to the outer surface 130 in order to prevent or reduce flow of liquid from passing that boundary and/or to keep liquid on one side of the boundary. In other examples, boundaries 52 may be applied to the surface to create multiple flow paths 50. In various embodiments, a single flow path 50 may be split into multiple flow paths such as two (bifurcated), three (trifurcated), or more flow paths. Multiple sets and types of boundaries 52 may also be used to form a plurality of discrete flow paths 50 and flow distributions. Similarly, lines, layers, strips, or areas of the wetting coating 54 may be applied in a portion of, or the whole, the flow path 50 to attract or encourage coolant to flow in a direction or flow path of the coating 54. The wetting coating 54 may be used in conjunction with the repellant coating for greater control of coolant flow.

In at least one embodiment, the repellant coating may be used to form one or more coolant flow paths 50 on an electric machine such as electric machine 100. For example, the repellant coating may be used to form flow paths 50 on the stator outer surface 130. During operation of the electric machine 100, coolant, such as an oil-based coolant (e.g., ATF), may be introduced into the transaxle housing 140 to remove heat. The coolant may be introduced in a variety of ways depending on the design of the particular electric machine. In some designs, the coolant may be pumped or otherwise released into the transaxle housing 140. For example, the coolant may be introduced at a top end or upper portion of the transaxle housing 140 and allowed to fall by gravity to cool the outer surface 130 of the stator. The coolant may be introduced at an angle, such that the coolant flow has a horizontal and vertical component when contacting the outer surface 130 of the stator 102, such that the coolant can be guided by the boundaries 52 formed by the repellant coating therefrom. The repellant coating and wetting coating may be applied to the outer surface 130 of the stator 120 in order to control or affect flow of the coolant over the outer surface 130. The repellant coating may be used to form boundaries defining flow paths that provide more uniform coolant flow over the surface than if no coating were present. The repellant coating may also be used to form boundaries to channel or guide coolant to areas requiring increased cooling or areas that would receive insufficient cooling if the coolant flow was not adjusted. For example, areas that receive insufficient cooling may form areas called hot spots. Other areas that may require or benefit from additional coolant flow may include the neutral point. The neutral point may be the connection of all three phase wires for a three phase electric motor. Since the neutral point joins all wires at one point, heat can be concentrated at that point and may form a type of hot spot.

With reference to FIGS. 7A-7D, examples of different shapes and patterns of flow paths 50 on the outer surface 130 of the stator 102 formed by boundaries of the repellant coating 52 are shown. As previously described, the patterns shown are merely examples, and other patterns may be formed depending on the desired flow path, such as to a neutral point or hot spots 127 on the end-windings 126. FIG. 7A shows a straight flow path 50 on outer surface 130 having a constant width, which may be formed by spaced apart parallel boundary lines 52 of repellant coating. FIG. 7B shows multiple straight flow paths 50 on outer surface 130, having constant widths, which may be formed by multiple spaced apart parallel boundary lines 52 of repellant coating. FIG. 7C shows a center-feed configuration where repellant coating provides stepped boundaries 52 around the periphery of the stator outer surface 130. The flow path 50 is fed to the outer surface 130, and to the sides as portions of coolant flow are directed by the boundaries 52 to the end-windings as the rotor 106 rotates. FIG. 7D shows a split flow path 50 with boundaries 52 forming a plurality of secondary flow paths towards the end-windings, hot spots 127, and specific portions of the outer surface 130. A portion of the coolant on the flow path 50 is guided by boundaries 52 to the end-windings, and the rest of the coolant flows down a straight path with additional boundaries 52 redirecting some coolant flow to the outer portions of the outer surface 130. As shown, an additional boundary 52, not forming a line, may be included to provide fluid distribution alterations in the flow path 50 after some coolant was guided to the end-windings. Similar to the above with respect to FIGS. 3-4 and 6, a wetting coating 54 may also be applied in the flow path 50 to further control the coolant flow, however it is not required.

Accordingly, (super) hydrophobic and/or oleophobic coating materials and/or (super) hydrophilic or oleophilic coating materials may be utilized in electric machines for thermal management. The use of these coating materials on the stator outer surface may allow for a controlled flow distribution without fixtures on the surface, which may require additional costs and may result in efficiency losses. In addition, the coating materials may improve the reliability of electric machines by eliminating localized hot spots and decreasing power loss. Moreover, a reduction in electric machine size may be realized due to the super hydrophobic/oleophobic coated surfaces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
   a stator core, within a transaxle housing, having a channel-less outer surface portion;
   one or more layers of an oleophobic or hydrophobic patterned coating defining boundaries wrapping around a perimeter of the stator core; and
   one or more layers of an oleophilic or hydrophilic coating on the portion within the boundaries configured to direct coolant flow over the oleophilic or hydrophilic coating within the boundaries.

2. The electric machine of claim 1, wherein the one or more layers of the oleophobic or hydrophobic patterned coating defines at least two spaced apart boundary lines to direct coolant flow on at least one straight coolant flow path.

3. The electric machine of claim 1, wherein the one Or more layers of the oleophobic or hydrophobic patterned coating defines intermittent boundaries to direct coolant flow on a plurality of coolant flow paths.

4. The electric machine of claim 3, wherein the intermittent boundaries include at least two spaced apart boundary lines forming a primary coolant flow path and at least one boundary in a portion of the primary coolant flow path forming one or more secondary coolant flow paths to direct coolant to target areas of the stator core.

5. The electric machine of claim 1, wherein the one or more layers of the oleophobic or hydrophobic patterned coating defines a zig-zag boundary to direct coolant flow on a zig-zag coolant flow path.

6. The electric machine of claim 1, wherein the one or more layers of the oleophobic or hydrophobic patterned coating is a super oleophobic or hydrophobic coating having a contact angle with an oil-based or water-based coolant of at least 130 degrees, respectively.

7. The electric machine of claim 1, wherein the coolant is an automatic transmission fluid.

8. An electric machine comprising:
   a stator core, within a transaxle housing, having a channel-less outer surface portion;
   one or more layers of an oleophobic or hydrophobic patterned coating defining boundaries wrapping around a perimeter of the stator core and configured to direct coolant flow over the channel-less outer surface portion within the boundaries; and
   one or more layers of an oleophilic or hydrophilic coating on the channel-less outer surface portion within the boundaries configured to direct coolant within the boundaries.

9. The electric machine of claim 8, wherein the one or more layers of the oleophobic or hydrophobic patterned coating defines at least two spaced apart boundary lines to direct coolant flow on at least one straight coolant flow path on the outer surface portion.

10. The electric machine of claim 8, wherein the one or more layers of the oleophobic or hydrophobic patterned coating defines intermittent boundaries including at least two spaced apart boundary lines forming a primary coolant flow path and at least one boundary in a portion of the primary coolant flow path forming one or more secondary coolant flow paths on the outer surface portion.

11. The electric machine of claim 10, wherein one or more secondary coolant flow paths direct coolant to end-windings of the stator core.

12. The electric machine of claim 8, wherein the one or more layers of the oleophobic or hydrophobic patterned coating defines a zig-zag boundary to direct coolant flow on a zig-zag coolant flow path on the outer surface portion.

13. The electric machine of claim 8, wherein the one or more layers of the oleophobic or hydrophobic patterned coating is a super oleophobic or hydrophobic coating having a contact angle with an oil-based or water-based coolant of at least 130 degrees, respectively.

14. The electric machine of claim 8, wherein the coolant is an automatic transmission fluid.

15. A method comprising:
applying one or more layers of an oleophobic or hydrophobic patterned coating to an outer surface portion of a stator core, the one or more layers defining boundaries wrapping around a perimeter of the stator core and configured to direct coolant flow within the boundaries; and
applying one or more layers of an oleophilic or hydrophilic coating to the outer surface portion within the boundaries to direct coolant flow within the boundaries.

16. The method of claim 15, wherein the one or more layers of the oleophilic or hydrophilic coating are applied by spraying.

17. The method of claim 15, wherein the one or more layers of the oleophobic or hydrophobic patterned coating are applied by spraying.

18. The method of claim 15, wherein the one or more layers of the oleophobic or hydrophobic patterned coating is a super oleophobic or hydrophobic coating having a contact angle with an oil-based or water-based coolant of at least 130 degrees, respectively.

* * * * *